US005987153A

United States Patent [19]
Chan et al.

[11] Patent Number: 5,987,153
[45] Date of Patent: Nov. 16, 1999

[54] AUTOMATED VERIFICATION AND PREVENTION OF SPOOFING FOR BIOMETRIC DATA

[75] Inventors: Chih S. Chan, Saratoga; Mohamed A. Moussa, Sunnyvale, both of Calif.

[73] Assignee: Quintet, Inc., Cupertino, Calif.

[21] Appl. No.: 08/639,613

[22] Filed: Apr. 29, 1996

[51] Int. Cl.[6] .................. G06K 9/00

[52] U.S. Cl. .................. 382/115; 340/825.34

[58] Field of Search .................. 382/115, 116, 382/119, 124, 112; 235/380, 382, 382.5; 340/825.3, 825.31, 825.32, 825.33, 825.34, 825.35; 902/3, 4, 5, 6, 25, 26

[56] References Cited

U.S. PATENT DOCUMENTS

| | | | |
|---|---|---|---|
| 4,805,222 | 2/1989 | Young et al. | 382/115 |
| 4,993,068 | 2/1991 | Piosenka et al. | 380/23 |
| 5,202,929 | 4/1993 | Lemelson | 382/116 |
| 5,559,895 | 9/1996 | Lee et al. | 382/119 |
| 5,642,431 | 6/1997 | Poggio et al. | 382/115 |
| 5,680,470 | 10/1997 | Moussa et al. | 382/119 |
| 5,692,065 | 11/1997 | Prakash et al. | 382/112 |

FOREIGN PATENT DOCUMENTS

| | | | |
|---|---|---|---|
| 0 281 224 | 1/1988 | European Pat. Off. | H04L 9/00 |
| WO 95/16974 | 6/1995 | WIPO | G06K 9/00 |

*Primary Examiner*—Joseph Mancuso
*Attorney, Agent, or Firm*—Steven A. Swernofsky

[57] ABSTRACT

The invention provides a method of and system for automated verification and prevention of spoofing for biometric data, such as handwritten signatures. Biometric data known to be true, such as signatures already entered by the authentic person, are recorded and compared against test biometric data, such as a test signature entered by a person seeking authentication. The test biometric data is compared against the known biometric data, and is accepted only if the test biometric data is sufficiently "close" to the known biometric data, but not so close as to indicate that known biometric data was recorded and played back for the test. The test biometric data represents a handwritten signature given contemporaneously by the person seeking access, and is verified against a set of template signatures earlier given by at least one authorized person. A set of features are extracted from both the template signatures and the test signature; comparison of these features yeilds a distance measure between the test signature and the template signature. If the distance measure is either too large or too small, the test signature is rejected. The extracted features for a set of test signatures which were accepted in the past is also recorded, and the test signature is rejected if it is identical to any of the past test signatures.

24 Claims, 2 Drawing Sheets

START: ATTEMPT AUTHENTICATION (240)
ENTER TEST SIGNATURE (251)
DETERMINE TEST FEATURES (252)
COMPARE TEST FEATURES AGAINST TEMPLATE FEATURES (253)
COMPARE TEST FEATURES AGAINST CACHE (254)
TEST SIGNATURE AUTHENTIC ? (255)
NO
END: ATTEMPT AUTHENTICATION (260)
YES
RECORD TEST SIGNATURE IN CACHE (256)
END: ATTEMPT AUTHENTICATION (260)

AUTOMATED VERIFICATION AND PREVENTION OF SPOOFING FOR BIOMETRIC DATA

BACKGROUND OF THE INVENTION

1. Field of the Invention

This invention relates to automated verification and prevention of spoofing for biometric data, such as handwritten signatures.

2. Description of Related Art

When collecting and verifying biometric data, such as handwritten signatures, one attack against security of the verification system is for the attacker to intercept the collection of the biometric data and for the attacker to repeat or "spoof" that identical biometric data in a later unauthorized access attempt. Since the repeated biometric data is identical to true biometric data, it will be accepted by a system which compares the input biometric data against known true biometric data, and the attacker will thus obtain unauthorized access.

One known method, not specific to biometric data, has been to tag authorization request messages with a timestamp, so that later spoofing of the authorization request message is detectable by the verification system. However, while this known method achieves the goal of preventing some spoofing, it is ineffective against spoofing when the attacker is able to obtain the biometric data at a source of entry. For example, where the biometric data is a handwritten signature entered by an authorized person using a pen tablet, this known method would be ineffective when the attacker is able to tap outputs from the pen tablet before they are processed by the verification system.

Accordingly, it would be advantageous to provide an improved method of and system for automated verification of biometric data, in which spoofing of biometric data is detected.

SUMMARY OF THE INVENTION

The invention provides a method of and system for automated verification and prevention of spoofing for biometric data, such as handwritten signatures. Biometric data known to be true, such as signatures already entered by the authentic person, are recorded and compared against test biometric data, such as a test signature entered by a person seeking authentication. The test biometric data is compared against the known biometric data, and is accepted only if the test biometric data is sufficiently "close" to the known biometric data, but not so close as to indicate that known biometric data was recorded and played back for the test.

In a preferred embodiment, the test biometric data represents a handwritten signature given contemporaneously by the person seeking access, and is verified against a set of template signatures earlier given by at least one authorized person. A set of features are extracted from both the template signatures and the test signature; comparison of these features yeilds a distance measure between the test signature and the template signature. If the distance measure is either too large or too small, the test signature is rejected. The extracted features for a set of test signatures which were accepted in the past is also recorded, and the test signature is rejected if it is identical to any of the past test signatures.

DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using one or more general purpose computers operating under program control, and that modification of general purpose computers to implement the process steps and data structures described herein would not require undue invention.

Inventions disclosed herein may be used in conjunction with methods, systems, or data structures shown in one or more of the following applications:

Application Ser. No. 08/169,654, filed Dec. 17, 1993, in the name of inventors Ali Mohamed Moussa and Chih Chan, titled "Method for Automatic Signature Verification", assigned to the same assignee, and having attorney docket number ACS-001; and Application Ser. No. 08/483,942, filed Jun. 7, 1995, in the name of inventors Ali Mohamed Moussa and Chih Chan, titled "Method for Automatic Signature Verification", assigned to the same assignee, and having attorney docket number ACS-002.

Each of these applications is hereby incorporated by reference as if fully set forth herein. These applications are collectively referred to herein as the "Signature Verification Disclosures".

SYSTEM FOR AUTOMATED VERIFICATION OF HANDWRITTEN SIGNATURES

Figure 1:
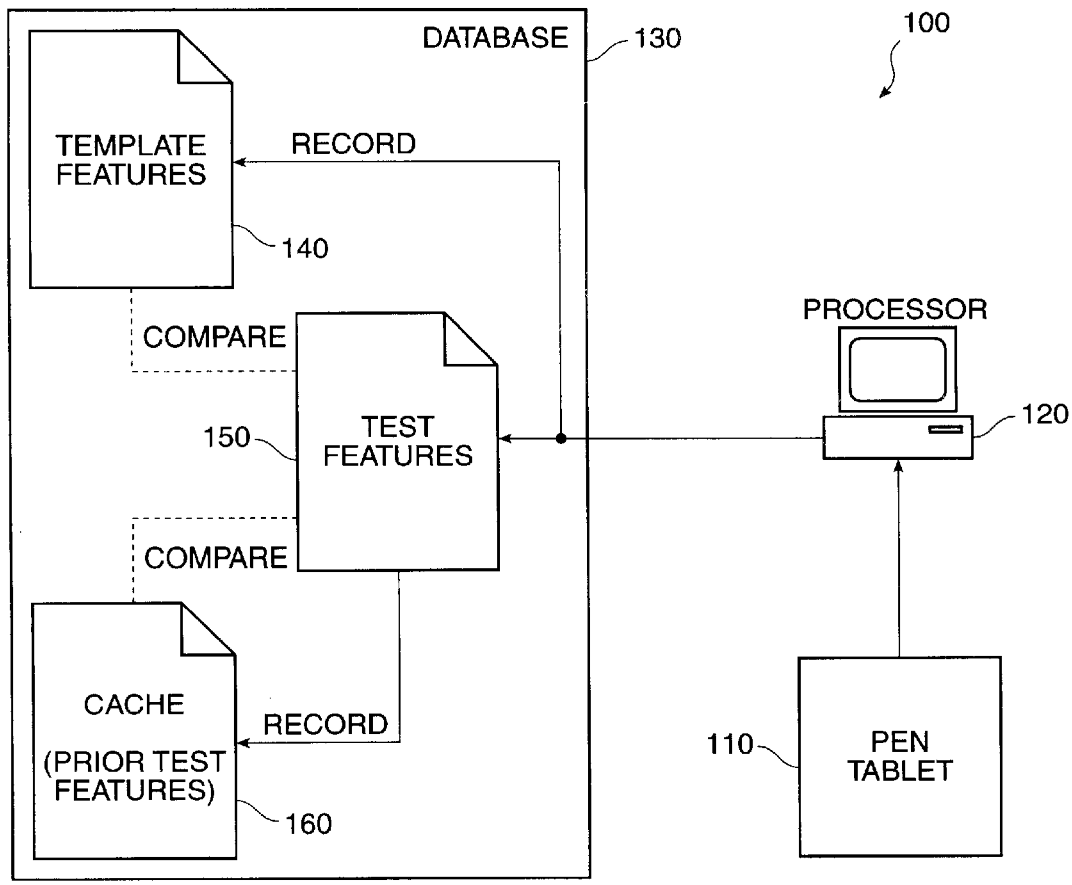
FIG. 1 is a diagram of a system for automated verification of handwritten signatures.

FIG. 1 is a diagram of a system for automated verification of handwritten signatures.

A system 100 for verification of handwritten signatures comprises a pen tablet 110 for receiving handwritten signatures, a processor 120 with program and data memory, and mass storage, for performing the steps of a method 200 for verification of handwritten signatures, and a database 130 for recording information about handwritten signatures.

In a preferred embodiment, the pen tablet 110 comprises a Wacom pen tablet and associated pen having a writing surface of about 4 inches deep by about 6 inches wide and generating digital signals representing handwritten signatures with a resolution of about 300 pixels per inch. The processor 120 comprises an IBM-PC-compatible computer, including an Intel x86 processor, at least 8 megabytes of RAM, and a magnetic disk. The database 130 is recorded on mass storage and in data memory for the processor 120, all operating under control of an application program which performs the method 200 described herein under supervision of operating system software such as MS-DOS, Microsoft Windows 3.1, or Microsoft Windows 95.

However, in alternative embodiments, the method 200 could be performed by other types of pen tablets 110, processors 120, or databases 130, or by application software under supervision of other operating system software. Implementing the method 200 with such other hardware would not require undue experimentation; such implementation would be within the scope and spirit of the invention.

In the method described herein, one or more authorized persons, such as persons authorized to access data available at the processor 120 or to pass through a portal controlled by the processor 120, each submits a plurality of handwritten signatures which are used for later authentication. These handwritten signatures are entered using the pen 110 and are defined as template signatures. The processor 120 examines the template signatures to define template features 140 thereof; the template features 140 are recorded in the database 130.

When a person seeks authentication, such as to access data available at the processor 120 or to pass through a portal controlled by the processor 120, the person seeking authentication submits at least one handwritten signature for comparison. This handwritten signature is entered using the pen 110 and is defined as a test signature. The processor 120 examines the test signature to define test features 150 thereof.

In the method 200, the processor 120 compares the test features 150 against the template features 140 to determine if the test signature is good.

The test features 150 are recorded in the database 130 in a cache 160. In a preferred embodiment, the cache 160 comprises an array of fifty sets of test features 150, but in alternative embodiments the cache 160 may comprise another type of data structure, such as a heap, linked list, or an associative memory (possibly a software-implemented associative memory such as a Hopfield matrix neural network), and may comprise a different number of sets of test features 150, such as twenty-five sets or one hundred sets.

In the method 200, the processor 120 also compares the test features 150 against the test features 150 recorded in the cache 160 to determine if the test signature is good.

VERIFICATION METHOD PERFORMED BY THE SYSTEM

Figure 2A:
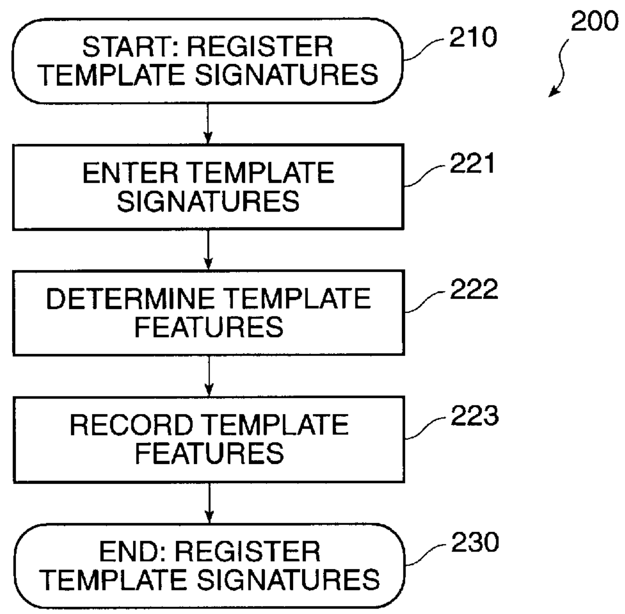
FIG. 2 (comprising FIG. 2A and FIG. 2B) is a flow diagram of a method of automated verification of handwritten signatures.
Figure 2B:
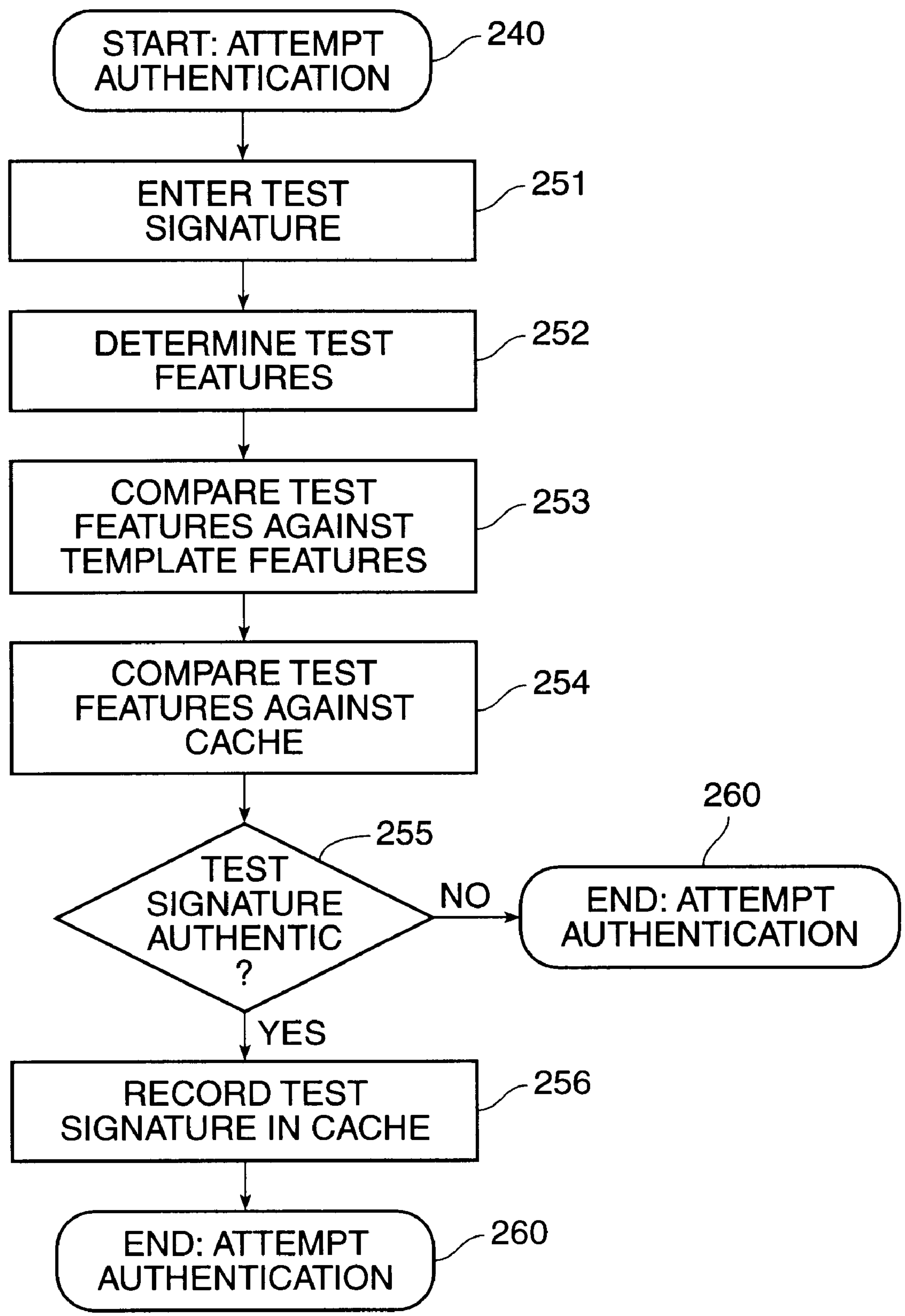

FIG. 2 is a flow diagram of a method of verification of handwritten signatures.

A method 200 is conducted by the system 100. In a preferred embodiment, the steps of the method 200 are performed by the processor 120, using the pen tablet 110 and the database 130.

At a flow point 210, one or more authorized persons desires to register template signatures with the system 100.

At a step 221, one or more authorized persons enters a set of template signatures using the pen tablet 110.

At a step 222, the processor 120 determines a set of template features 140 responsive to the template signatures. In a preferred embodiment, the processor 120 uses methods for determining the template features 140 shown in the Signature Verification Disclosures.

At a step 223, the processor 120 records the template features 140 in the database 130.

At a flow point 230, the template signatures have been registered with the system 100, and the processor 120 is therefore ready to receive a test signature for authentication.

In alternative embodiments, the template features 140 could be generated in response to biometric data other than handwritten signatures. For example, such other biometric data may comprise all or a selected part of, or an encoding of, a set of biometric information about a person, which biometric information may comprise a facial image, a fingerprint, a hand image or handprint, a foot image or footprint, a human genome or related genetic information, a retinal image, a voiceprint or other record of a spoken statement, a set of intercharacter typing times, or alternatively any other biometric information which is substantially unique to a first selected individual and difficult to adapt to a second selected individual. Biometric information differs from memorized information such as a password. Authentication using biometric information differs from physical forms of authentication such as using a pass key.

At a flow point 240, a person seeks authentication using the system 100.

At a step 251, the processor 120 receives one or more test signatures from the person seeking authorization.

At a step 252, the processor 120 determines a set of test features 150 responsive to the test signatures. In a preferred embodiment, the processor 120 uses methods for determining the template features 140 shown in the Signature Verification Disclosures.

At a step 253, the processor 120 compares the test features 150 against the template features 140 which have been recorded in the database 130. In a preferred embodiment, the processor 120 uses methods for comparing the template features 140 shown in the Signature Verification Disclosures. If the test features 150 are "too far" from the template features 140, the test signature is rejected as not being genuine. If the test features 150 are not "too far" from the template features 140, the test signature is regarded as being genuine.

At a step 254, the processor 120 compares the test features 150 against the cache 160 of prior test features. If the test features 150 are "too close" to any prior set of test features in the cache 160, the test signature is rejected as being a replay or "spoof" of a prior test signature. If the test features 150 are not "too close" to any prior set of test features in the cache 160, the test signature is regarded as being original.

In a preferred embodiment, the step 254 is peformed by the processor 120 examining each set of prior test features in the cache 160, one by one, and comparing those prior test features with the current test features 150 for literal equality. If any set of prior test features is equal to the current test features 150, the current test features 150 are regarded as being "too close".

In alternative embodiments, the processor 120 may use different definintions of when the current test features 150 are "too close" to the prior set of test features in the cache 160. In one such alternative embodiment, the processor 120 performs the following sub-steps to determine whether current test features 150 are "too close" to the prior set of test features in the cache 160.

In a first sub-step for the step 254, the processor 120 determines, for each feature individually, a pairwise distance between each pair of template signatures. Thus, for each pair of template signatures, a first pairwise distance is determined for a first feature, a second pairwise distance is determined for a second feature, and so on for each feature, yielding (for each feature) a set of inter-signature distances.

In a second sub-step for the step 254, the processor 120 determines, for each feature, a mean and standard deviation of the inter-signature distances. In a preferred embodiment, the inter-signature distances are matched to a semi-bell curve (having a minimum value of zero), and the mean and standard deviation of the corresponding bell curve are used.

In a third sub-step for the step 254, the processor 120 determines, for each feature, a minimum acceptable distance measure for that feature. In a preferred embodiment, where the mean and standard deviation are determined as in the second sub-step of the step 254 noted herein, the minimum acceptable distance measure comprises at least 0.5 times the standard deviation determined in that sub-step of the step 254.

In a fourth sub-step for the step 254, the processor 120 determines, for each prior set of test features in the cache 160 and for each recorded feature thereof, whether that recorded feature is within the minimum acceptable distance measure of the corresponding feature in the test features 150. If, for any of the sets of test features in the cache 160, all of the features for that set are less than the minimum acceptable distance measure for the corresponding feature in the test features 150, the test signature is regarded as being a replay or spoof of that prior test signature, and therefore rejected as unoriginal.

If the test features 150 are rejected as being not original (i.e., replayed or spoofed), the processor 120 may take further action to preserve the security of the actually authorized person. For example, the processor 120 may record that the authentication attempt was rejected in an authentication log (not shown), may send a message so indicating to a designated location using a communication link (not shown), may raise an interrupt for urgent processing by another application, or may raise an audible or visible alarm.

At a step 255, a branch is performed in response to whether the test signature was accepted as genuine and original (i.e., not spoofed), or whether the test signature was rejected as either not genuine or not original (i.e., spoofed). If the test signature was accepted, the processor 120 continues with the step 256; if the test signature was rejected, the processor 120 continues at the flow point 260.

At a step 256, the processor 120 records the test features 150 in the cache 160.

The cache 160 comprises an array of individual sets of test features 150, sorted in the order they were entered. The array comprises fifty entries. Each set of test features 150 is entered by writing those test features 150 to the next location in the array, wrapping around when the array boundary is met. Thus, as each set of test features 150 is entered, a set of test features 150 from fifty test signatures ago is written over and therefore forgotten.

In alternative embodiments, particularly where the cache 160 comprises an alternative data structure, the test features 150 are entered in an alternative manner appropriate to the alternative data structure. In some such alternative data structurs, such as a heap, linked list, or an associative memory (possibly a software-implemented associative memory such as a Hopfield matrix neural network), the processor 120 may not find it necessary to write over and forget older sets of test features 150.

At a flow point 260, the authentication attempt is completed.

Alternative Embodiments

Although preferred embodiments are disclosed herein, many variations are possible which remain within the concept, scope, and spirit of the invention, and these variations would become clear to those skilled in the art after perusal of this application.

The invention is described herein with reference to an embodiment in which the biometric data represents handwritten signatures. However, in alternative embodiments, the biometric data may represent facial images, fingerprints, hand images or handprints, foot images or footprints, human genome data, retinal images, voiceprints, recorded spoken statements, or other biometric data, or any arbitrary data which is particular to the authorized persons or the person seeking access, and which is unlikely to be exactly duplicated in separate instances.

For example, like handwritten signatures, biometric data representing intercharacter typing times, photographic or other image data representing facial images, or voiceprints or other voice data such as recorded spoken statements, are unlikely to be exactly duplicated in separate instances. The invention may thus be used to reject those test biometric data which are either too close or too far from known true biometric data.

We claim:

1. A method for verification of biometric data, said method comprising the steps of receiving template biometric data known to be associated with at least one authorized person;

receiving test biometric data;

comparing said test biometric data against said template biometric data; and verifying said test biometric data, responsive to said step of comparing, only if both (1) said test biometric data is sufficiently similar to said template biometric data to indicate that said test biometric data is associated with said at least one authorized person, and (2) said test biometric data is not so similar to said template biometric data as to indicate that said test biometric data was spoofed.

2. A method as in claim 1, wherein said template biometric data comprises information representing a facial image, a fingerprint, a hand image or handprint, a foot image or footprint, a set of human genome data, a retinal image, a voiceprint, a recorded spoken statement, or a set of intercharacter typing times.

3. A method as in claim 1, wherein said template biometric data represents handwritten signature data given by said at least one authorized person.

4. A method as in claim 1, wherein said test biometric data represents handwritten signature data given contemporaneously by a person seeking access.

5. A method as in claim 1, wherein said step of comparing said test biometric data against said template biometric data yields a distance measure between said test biometric data and said template biometric data.

6. A method as in claim 5, wherein said step of verifying operates to verify said test biometric data only if said distance measure is both less than a selected maximum value and more than a selected minimum value.

7. A method as in claim 5, wherein said template biometric data comprises a plurality of template signatures from one said authorized person;

said step of comparing operates to compare said test biometric data against each one of said plurality of template signatures, yielding a plurality of differences; and said distance measure is responsive to said plurality of differences.

8. A method as in claim 5, wherein said template biometric data comprises a plurality of template signatures from one said authorized person;

said step of comparing comprises the step of defining a plurality of inter-template differences; and said selected maximum value is responsive to said plurality of inter-template differences.

9. A method as in claim 5, wherein said template biometric data comprises a plurality of template signatures from one said authorized person;

said step of comparing comprises the step of defining a plurality of inter-template differences; and said selected minimum value is responsive to said plurality of inter-template differences.

10. A method as in claim 1, comprising the steps of defining template features for said template biometric data; and defining test features for said test biometric data;

wherein said step of comparing said test biometric data against said template biometric data comprises comparing said test features against said template features.

11. A method as in claim 1, comprising the steps of recording information about past test biometric data; and further comparing said test biometric data against said information about past test biometric data;

wherein said step of verifying said test biometric data is also responsive to said step of further comparing, and operates to verify said test biometric data only if said test biometric data is not so similar to said past test biometric data as to indicate that said test biometric data was spoofed.

12. A method as in claim 11, comprising the steps of defining test features for said test biometric data;

wherein said information about said past test biometric data comprising said test features for said past test biometric data;

wherein said step of verifying operates to verify said test biometric data only if said test features for said test biometric data are not identical to said test features for said past test biometric data.

13. A system for verification of biometric data, said system comprising means for receiving template biometric data known to be associated with at least one authorized person;

means for receiving test biometric data;

means for comparing said test biometric data against said template biometric data; and means for verifying said test biometric data, responsive to said step of comparing, only if both (1) said test biometric data is sufficiently similar to said template biometric data to indicate that said test biometric data is associated with said at least one authorized person, and (2) said test biometric data is not so similar to said template biometric data as to indicate that said test biometric data was spoofed.

14. A system as in claim 13, wherein said template biometric data comprises information representing a facial image, a fingerprint, a hand image or handprint, a foot image or footprint, a set of human genome data, a retinal image, a voiceprint, a recorded spoken statement, or a set of inter-character typing times.

15. A system as in claim 13, wherein said template biometric data represents handwritten signature data given by said at least one authorized person.

16. A system as in claim 13, wherein said test biometric data represents handwritten signature data given contemporaneously by a person seeking access.

17. A system as in claim 13, wherein said means for comparing said test biometric data against said template biometric data yields a distance measure between said test biometric data and said template biometric data.

18. A system as in claim 17, wherein said means for verifying operates to verify said test biometric data only if said distance measure is both less than a selected maximum value and more than a selected minimum value.

19. A system as in claim 17, wherein said template biometric data comprises a plurality of template signatures from one said authorized person;

said means for comparing operates to compare said test biometric data against each one of said plurality of template signatures, yielding a plurality of differences; and said distance measure is responsive to said plurality of differences.

20. A system as in claim 17, wherein said template biometric data comprises a plurality of template signatures from one said authorized person;

said means for comparing comprises means for defining a plurality of inter-template differences; and said selected maximum value is responsive to said plurality of inter-template differences.

21. A system as in claim 17, wherein said template biometric data comprises a plurality of template signatures from one said authorized person;

said means for comparing comprises means for defining a plurality of inter-template differences; and said selected minimum value is responsive to said plurality of inter-template differences.

22. A system as in claim 13, comprising defining template features for said template biometric data; and defining test features for said test biometric data;

wherein said means for comparing said test biometric data against said template biometric data comprises comparing said test features against said template features.

23. A system as in claim 13, comprising recording information about past test biometric data; and further comparing said test biometric data against said information about past test biometric data;

wherein said means for verifying said test biometric data is also responsive to said means for further comparing, and operates to verify said test biometric data only if said test biometric data is not so similar to said past test biometric data as to indicate that said test biometric data was spoofed.

24. A system as in claim 23, comprising defining test features for said test biometric data;

wherein said information about said past test biometric data comprising said test features for said past test biometric data;

wherein said means for verifying operates to verify said test biometric data only if said test features for said test biometric data are not identical to said test features for said past test biometric data.

* * * * *